US012583962B2

(12) United States Patent
Takagi et al.

(10) Patent No.: US 12,583,962 B2
(45) Date of Patent: Mar. 24, 2026

(54) WHITE LAMINATED POLYESTER FILM

(71) Applicant: TOYOBO CO., LTD., Osaka (JP)

(72) Inventors: Noriyuki Takagi, Otsu (JP); Eiji Kumagai, Otsu (JP); Takeshi Kubo, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 1040 days.

(21) Appl. No.: 17/629,879

(22) PCT Filed: Jul. 10, 2020

(86) PCT No.: PCT/JP2020/027107
§ 371 (c)(1),
(2) Date: Jan. 25, 2022

(87) PCT Pub. No.: WO2021/024701
PCT Pub. Date: Feb. 11, 2021

(65) Prior Publication Data
US 2022/0275139 A1 Sep. 1, 2022

(30) Foreign Application Priority Data

Aug. 2, 2019 (JP) ................................. 2019-142891

(51) Int. Cl.
| | |
|---|---|
| *C08J 5/18* | (2006.01) |
| *C08G 18/32* | (2006.01) |
| *C08G 18/72* | (2006.01) |
| *C09D 175/04* | (2006.01) |

(52) U.S. Cl.
CPC ......... *C08G 18/3206* (2013.01); *C08G 18/72* (2013.01); *C08J 5/18* (2013.01); *C09D 175/04* (2013.01); *C08J 2367/02* (2013.01)

(58) Field of Classification Search
CPC ................ C08G 18/3206; C08G 18/72; C08G 18/0823; C08G 18/12; C08G 18/302; C08G 18/348; C08G 18/4238; C08G 18/44; C08G 18/758; C08G 18/7642; C08G 18/792; C08G 18/797; C08G 18/80; C08J 5/18; C08J 2367/02; C08J 2467/00; C08J 2467/02; C08J 3/226; C08J 2367/00; C08J 2475/04; C08J 7/04; C08J 7/0427; C08J 7/042; C08J 2475/06; C09D 175/04; C09D 5/002; C09D 11/101; C09D 167/00; C09D 7/65; C09D 175/06; B32B 27/32; B32B 27/20; B32B 2250/03; B32B 27/302; B32B 2307/4026; B32B 27/36; B32B 2250/40; B32B 2255/10; B32B 2255/26; B32B 2264/102; B32B 2264/302; B32B 2270/00; B32B 2307/518; B32B 2553/00; B32B 2559/00; B32B 27/26; B32B 27/40; C08L 75/08; C08L 67/00
See application file for complete search history.

(56) References Cited

U.S. PATENT DOCUMENTS 6,610,779 B1 8/2003 Blum et al.

FOREIGN PATENT DOCUMENTS

| | | |
|---|---|---|
| CN | 102497985 A | 6/2012 |
| EP | 3925776 A1 | 12/2021 |
| EP | 3950348 A1 | 2/2022 |
| JP | H03-169529 A | 7/1991 |
| JP | 2000-229355 A | 8/2000 |
| JP | 3169529 B2 * | 5/2001 |
| JP | 2002537454 A * | 11/2002 |
| JP | 2005-089613 A | 4/2005 |
| JP | 2010274647 A * | 12/2010 |
| JP | 2011-140233 A | 6/2011 |
| JP | 2011140542 A * | 7/2011 |
| JP | 2012-121196 A | 6/2012 |
| JP | 2013-023611 A | 2/2013 |
| JP | 2014196461 A * | 10/2014 |
| JP | 2014-224268 A | 12/2014 |
| WO | WO 2012/039259 A1 | 3/2012 |

OTHER PUBLICATIONS

Japanese Patent Office, International Search Report in International Patent Application No. PCT/JP2020/027107 (Sep. 29, 2020).
European Patent Office, Extended European Search Report in European Patent Application No. 20850677.4 (Jul. 21, 2023).

* cited by examiner

*Primary Examiner* — Kumar R Bhushan
(74) *Attorney, Agent, or Firm* — Leydig, Voit & Mayer, Ltd.

(57) ABSTRACT

Provided is a white laminated polyester film that has blocking resistance when water adheres and has excellent adhesion to UV ink. A white laminated polyester film comprising a polyester resin layer and a coating layer on at least one surface of the polyester film substrate, the coating layer being formed by curing a composition containing a urethane resin with a polycarbonate structure and a branched structure, a crosslinking agent, and a polyester resin. The crosslinking agent is preferably a compound containing three or more blocked isocyanate groups.

8 Claims, No Drawings

WHITE LAMINATED POLYESTER FILM

TECHNICAL FIELD

The present invention relates to a white laminated polyester film. More specifically, the present invention relates to a white laminated polyester film suitable as an information recording material and a printing material that can reduce blocking when water adheres and that have excellent adhesion to ink.

Biaxially stretched polyester films, which have excellent properties such as mechanical properties, electrical properties, and dimensional stability, have been used as a substrate film in many fields of, for example, magnetic recording materials, packaging materials, electrically insulating materials, photosensitive materials, drawing materials, and photographic materials. However, in such uses, the polyester film has a drawback in that when another material is applied to form a layer on the polyester film, the material may poorly adhere to the polyester film, depending on the material used.

A known method for imparting adhesion to the surface of a polyester film comprises applying one or more of various resins to the surface of the polyester film to form a readily adhesive coating layer.

In terms of various conventional polyester-based coating films for ink adhesion as well, many methods can be found in which a coating layer formed of a specific resin is provided on the surface of the substrate polyester film (see, for example, Patent Literature (PTL) 1). The resin constituting the coating layer may be, for example, a single resin selected from a polyester resin, a polyurethane resin, and an acrylic resin, a mixture of two or more of these resins, or a mixture of one or more of these resins with a specific crosslinking agent (e.g., melamine and isocyanate).

However, such a conventional technique can suffer from problems, for example, when film rolls are transported, in particular, in winter. For example, when film rolls are transported between indoors, such as inside a factory, and outdoors, dew condensation water forms on the film roll due to the difference between the indoor temperature and the outside air temperature, which can result in the occurrence of blocking problems in which the film surfaces and the coating layers adhere to each other. The blocking here occurs only through liquid water and is different from typical blocking, which occurs under pressure after being left in air containing water vapor. More specifically, it has been difficult to achieve both adhesion to ink and blocking resistance. In particular, it has been extremely difficult to achieve both adhesion to UV-curable ink (UV ink) and blocking resistance. Although seasoning is effective in avoiding these problems, the problems cannot be completely avoided. Further, the addition of the seasoning process results in problems with delayed processing, causing deterioration of productivity.

CITATION LIST

Patent Literature

PTL 1: JP2000-229355A

SUMMARY OF INVENTION

Technical Problem

The present invention has been made in view of the above problems of the prior art. More specifically, an object of the present invention is to provide a white laminated polyester film that has blocking resistance when water adheres and has excellent adhesion to UV ink.

Solution to Problem

To achieve the above object, the present inventors investigated causes etc. of the above problems. During their investigation, the inventors found that when a laminated polyester film has a coating layer formed on at least one surface of a polyester film substrate, and the coating layer is formed by curing a composition comprising a crosslinking agent, a polyester resin, and a urethane resin having a polycarbonate structure and a branched structure, the object of the present invention can be achieved. The inventors have accomplished the present invention based on these findings.

Specifically, the present invention has the following features.

1. A white laminated polyester film comprising a polyester film substrate and a coating layer on at least one surface of the polyester film substrate, the coating layer being formed by curing a composition containing a urethane resin with a polycarbonate structure and a branched structure, a crosslinking agent, and a polyester resin.

2. The white laminated polyester film according to Item 1, wherein the crosslinking agent is a compound containing three or more blocked isocyanate groups.

3. The white laminated polyester film according to Item 1 or 2, wherein the urethane resin with a polycarbonate structure and a branched structure is obtained by synthesizing and polymerizing a polycarbonate polyol component and a polyisocyanate component, and the mass ratio of the polycarbonate polyol component to the polyisocyanate component (the mass of the polycarbonate polyol component/the mass of the polyisocyanate component) in the synthesis and polymerization is within the range of 0.5 to 3.

Advantageous Effects of Invention

The white laminated polyester film of the present invention does not suffer from blocking even when dew condensation water adheres, and has excellent adhesion to UV ink. In particular, the white laminated polyester film has excellent adhesion to UV ink after processing with low-dose UV.

DESCRIPTION OF EMBODIMENTS

Polyester Film Substrate

In the present invention, the polyester resin forming the polyester film substrate is, for example, polyethylene terephthalate, polybutylene terephthalate, polyethylene-2,6-naphthalate, polytrimethylene terephthalate, or a copolyester resin in which a portion of the diol component or dicarboxylic acid component of a polyester resin described above is replaced by a copolymerization component. Examples of copolymerization components include diol components, such as diethylene glycol, neopentyl glycol, 1,4-cyclohexanedimethanol, and polyalkylene glycol; dicarboxylic acid components, such as adipic acid, sebacic acid, phthalic acid, isophthalic acid, 5-sodium isophthalic acid, and 2,6-naphthalenedicarboxylic acid; and the like.

The polyester resin preferably used for the polyester film substrate in the present invention is mainly selected from polyethylene terephthalate, polytrimethylene terephthalate, polybutylene terephthalate, and polyethylene-2,6-naphthalate. Among these polyester resins, polyethylene terephthalate is most preferred in terms of the balance between physical properties and cost. The polyester film substrate formed from such a polyester resin is preferably a biaxially stretched polyester film, and can improve chemical resistance, heat resistance, mechanical strength, and the like.

The catalyst for polycondensation used in the production of the polyester resin is not particularly limited. Antimony trioxide is suitable because it is an inexpensive catalyst with excellent catalytic activity. It is also preferable to use a germanium compound or a titanium compound. More preferred examples of polycondensation catalysts include a catalyst containing aluminum and/or a compound thereof, and a phenolic compound; a catalyst containing aluminum and/or a compound thereof, and a phosphorus compound; and a catalyst containing an aluminum salt of a phosphorus compound.

The polyester film substrate in the present invention is particularly preferably a biaxially oriented film in terms of practical use, i.e., strength and stiffness.

The polyester film substrate may have a single-layer structure or a laminated structure, and preferably has a laminated structure consisting of a layer A, a layer B, and a layer A in this order, wherein the layer A contains inorganic particles, and the layer B contains fine cavities. The use of the layer A, which contains inorganic particles, as the surface layers can improve sliding properties, i.e., handling properties, of the film, as well as concealment properties. Further, the presence of fine cavities only in the layer B, which is the inner layer, can achieve a desirable white appearance. Additionally, the film surface can have sufficient strength while achieving cushioning properties of the film. The method of forming the laminated structure is not particularly limited here. A method that involves coextrusion is preferred from the standpoint of stability during production and processing costs.

Further, the polyester film substrate in the present invention may have a single-layer structure or a multilayer structure. It is preferable that some or all of the layers are opaque. The optical density representing the opacity of the white laminated polyester film is preferably 0.3 or more, more preferably 0.3 to 4.0, and particularly preferably 0.5 to 3.0. An optical density of 0.3 or more is preferred to achieve a clearer printing effect when printing is applied to the surface of the coating layer of the white laminated polyester film. Further, an optical density of 4.0 or less is preferred since a better printing effect can be expected.

The method of obtaining an optical density within the above ranges is not particularly limited. The optical density within the above ranges can be obtained by using a polyester resin that contains inorganic particles or a thermoplastic resin that is incompatible with the polyester resin. The contents are not particularly limited. The content of inorganic particles, if contained, is preferably 5 to 35 mass %, and particularly preferably 8 to 25 mass %, of the produced polyester. The content of the incompatible thermoplastic resin, if contained, is 5 to 35 mass %, and particularly preferably 8 to 28 mass %, of the polyester. The total amount of inorganic particles and a thermoplastic resin that is incompatible with polyester resin, when these are used in combination, is preferably 40 mass % or less of the polyester film substrate, in terms of film strength and stiffness, and to stably form a film.

The inorganic particles for use are not particularly limited. The inorganic particles preferably have an average particle size of 0.1 to 4.0 μm, and particularly preferably 0.3 to 1.5 μm. Specifically, white pigments, such as titanium oxide, barium sulfate, calcium carbonate, and zinc sulfide are preferred, and these may be used in combination. Further, inorganic particles commonly incorporated in films, such as silica, alumina, talc, kaolin, clay, calcium phosphate, mica, hectorite, zirconia, tungsten oxide, lithium fluoride, calcium fluoride, and calcium sulfate, may also be used in combination.

The thermoplastic resin that is incompatible with polyester resin is not particularly limited. For example, to mix with a polyethylene terephthalate resin, examples of the thermoplastic resin that is incompatible with polyester resin include polyolefin resins, such as polystyrene resin, polyethylene resin, polypropylene resin, and polymethylpentene resin, acrylic resin, phenoxy resin, polyphenylene oxide resin, polycarbonate resin, and the like. These thermoplastic resins may be a mixture and may be modified. Of course, these thermoplastic resins can be used in combination with the inorganic particles mentioned above. Additionally, of course, various whitening agents may be added as necessary.

The average particle size of the particles is measured by observing the particles in the cross-section of the film with a scanning electron microscope. Specifically, 50 particles are observed, and the average value of the particle sizes of the particles is defined as the average particle size.

The shape of the particles is not particularly limited as long as it satisfies the object of the present invention, and spherical particles and non-spherical particles having an irregular shape can be used. The particle size of particles having an irregular shape can be calculated as an equivalent circle diameter. The equivalent circle diameter is a value obtained by dividing the area of the observed particle by $\pi$, calculating the square root, and doubling the value of the square root.

Furthermore, the white laminated polyester film of the present invention is preferably a fine-cavity-containing polyester film having an apparent density of 0.3 to 1.3 g/cm$^3$.

The white laminated polyester film also preferably has a density of layered cavities of 0.20 cavities/μm or more, preferably 0.25 cavities/μm or more, and more preferably 0.30 cavities/μm or more, in terms of achieving both cushioning properties and surface peel strength. Within these ranges, the obtained white laminated polyester film achieves excellent printing clarity and excellent processing characteristics during printing. The density of layered cavities (cavities/μm) as used herein is defined according to the following formula: layered cavities in the thickness direction of the film (cavities)/film thickness (μm). The upper limit of the density of layered cavities is preferably 0.80 cavities/μm, and more preferably 0.55 cavities/μm, in terms of efficiency in cavity expression. The density may be adjusted to be within the above ranges by adjusting the amount, type, and viscosity, etc. of the incompatible thermoplastic resin to be added, changing the screw shape of an extruder, installing a static mixer in a molten resin flow path, or the like, without limitation.

The white laminated polyester films that contain cavities are particularly useful because the fine cavities present in the film cause light scattering at the interface with the polyester matrix, thus further increasing opacity. This makes it possible to reduce the amount of the inorganic particles to be added. In addition, the presence of fine cavities can make the substrate film itself lighter; thus, handling becomes easier, and greater economic effects, such as a reduction in costs for starting materials and transportation, are achieved.

The white laminated polyester film as described above may be obtained by known methods that have already been published, such as a method comprising kneading a thermoplastic polyester resin that serves as a matrix with a thermoplastic resin that is incompatible with the polyester resin, and stretching, in at least one axial direction, a sheet obtained by dispersing the incompatible resin in the form of fine particles in the polyester resin to thus form cavities around the fine particles of the incompatible resin.

The resulting white laminated polyester film has a thickness of preferably 5 to 300 μm. In particular, the white laminated polyester film that has a density of layered cavities of 0.20 cavities/μm or more preferably has a thickness of 20 to 300 μm, and more preferably 40 to 250 μm.

The whiteness required when the film is used for printing materials etc. can be represented by color values. In particular, color L-values serve as a scale of brightness; a higher value represents a clearer white color. Further, a higher color b-value represents a stronger yellow color, while a lower value represents a stronger blue color. That is, a higher L-value and a lower b-value represent a high degree of whiteness, i.e., a visually strong white color. This improves clarity in the printing process.

Coating Layer

To improve adhesion to UV ink and blocking resistance when water adheres, the white laminated polyester film of the present invention preferably comprises a coating layer laminated on at least one surface of the polyester film substrate, the coating layer being formed by curing a composition containing a urethane resin with a polycarbonate structure and a branched structure, a crosslinking agent, and a polyester resin. It is believed that the coating layer is formed by crosslinking and curing the urethane resin with a polycarbonate structure and a branched structure, and the polyester resin, with the crosslinking agent. However, since it is difficult to describe the crosslinked chemical structure itself, it is described as being formed by curing the composition containing the urethane resin with a polycarbonate structure and a branched structure, the crosslinking agent, and the polyester resin. The coating layer may be formed on both surfaces of the polyester film substrate. Alternatively, the coating layer may be formed on only one surface of the polyester film substrate, and a different resin coating layer may be formed on the other surface.

Each of the components of the coating layer is described below in detail.

Urethane Resin with Polycarbonate Structure and Branched Structure

The urethane resin with a polycarbonate structure in the present invention preferably has at least a urethane bond moiety and a branched structure that are derived from a polycarbonate polyol component and a polyisocyanate component; and further contains a chain extender, as necessary. The branched structure referred to herein is suitably introduced to the urethane by synthesizing and polymerizing the aforementioned starting material components that form the molecular chain, at least one of which has three or more terminal functional groups, thereby forming a branched molecular chain structure.

The lower limit of the number of terminal functional groups in the molecular chain of the urethane resin with a polycarbonate structure and a branched structure in the present invention is preferably 3, and more preferably 4, by virtue of the branched structure. The number is preferably 3 or more to improve blocking resistance when water adheres. The upper limit of the number of terminal functional groups in the molecular chain of the urethane resin with a polycarbonate structure in the present invention is preferably 6, by virtue of the branched structure. The number is preferably 6 or less to stably disperse the resin in an aqueous solution.

The lower limit of the mass ratio of the polycarbonate polyol component to the polyisocyanate component (the mass of the polycarbonate polyol component/the mass of the polyisocyanate component) in the synthesis and polymerization of the urethane resin with a polycarbonate structure and a branched structure in the present invention is preferably 0.5, more preferably 0.6, even more preferably 0.7, particularly preferably 0.8, and most preferably 1.0. A mass ratio of 0.5 or more is preferred because adhesion to UV ink can be improved. The upper limit of the mass ratio of the polycarbonate polyol component to the polyisocyanate component in the synthesis and polymerization of the urethane resin with a polycarbonate structure in the present invention is preferably 3.0, more preferably 2.2, even more preferably 2.0, particularly preferably 1.7, and most preferably 1.5. A mass ratio of 3.0 or less is preferred because blocking resistance can be improved when water adheres.

The polycarbonate polyol component used to synthesize and polymerize the urethane resin with a polycarbonate structure and a branched structure in the present invention preferably contains an aliphatic polycarbonate polyol having excellent heat resistance and hydrolysis resistance. Examples of the aliphatic polycarbonate polyol include aliphatic polycarbonate diols, aliphatic polycarbonate triols, and the like. Preferably, aliphatic polycarbonate diols can be used. Examples of aliphatic polycarbonate diols that can be used to synthesize and polymerize the urethane resin with a polycarbonate structure in the present invention include aliphatic polycarbonate diols obtained by reacting one or more diols, such as ethylene glycol, propylene glycol, 1,3-propanediol, 1,4-butanediol, 1,5-pentanediol, 3-methyl-1,5-pentanediol, 1,6-hexanediol, 1,9-nonanediol, 1,8-nonanediol, neopentyl glycol, diethylene glycol, and dipropylene glycol, with, for example, a carbonate, such as dimethyl carbonate, ethylene carbonate, or phosgene; and the like.

In the present invention, the polycarbonate polyol preferably has a number average molecular weight of 1000 to 3000, more preferably 1200 to 2900, and most preferably 1500 to 2800. A number average molecular weight of 1000 or more is preferred because ink adhesion can be improved. A number average molecular weight of 3000 or less is preferred because blocking resistance can be improved when water adheres.

Examples of polyisocyanate components that can be used to synthesize and polymerize the urethane resin with a polycarbonate structure and a branched structure in the present invention include aromatic aliphatic diisocyanates, such as xylylene diisocyanate; alicyclic diisocyanates, such as isophorone diisocyanate, 4,4-dicyclohexylmethane diisocyanate, and 1,3-bis(isocyanatomethyl)cyclohexane; aliphatic diisocyanates, such as hexamethylene diisocyanate and 2,2,4-trimethylhexamethylene diisocyanate; and polyisocyanates obtained by adding one or more of these compounds to, for example, trimethylolpropane. The aromatic aliphatic diisocyanates, alicyclic diisocyanates, aliphatic diisocyanates, and the like are preferred because there is no problem of yellowing when they are used. They are also preferred because the resulting coating film is not overly hard, the stress due to thermal shrinkage of the polyester film substrate can be relaxed, and good adhesion is exhibited.

Examples of chain extenders include glycols, such as ethylene glycol, diethylene glycol, 1,4-butanediol, neopentyl glycol, and 1,6-hexanediol; polyhydric alcohols, such as glycerol, trimethylolpropane, and pentaerythritol; diamines, such as ethylenediamine, hexamethylenediamine, and piperazine; amino alcohols, such as monoethanolamine and diethanolamine; thiodiglycols, such as thiodiethylene glycol; and water.

To form a branched structure in the urethane resin, for example, a method comprising reacting the polycarbonate polyol component, the polyisocyanate, and the chain extender at a suitable temperature for a suitable period of time, adding a compound containing three or more hydroxyl groups or isocyanate groups, and further allowing the reaction to proceed can be preferably adopted.

Specific examples of the compound containing three or more hydroxyl groups include caprolactone triol, glycerol, trimethylolpropane, butanetriol, hexanetriol, 1,2,3-hexanetriol, 1,2,3-pentanetriol, 1,3,4-hexanetriol, 1,3,4-pentanetriol, 1,3,5-hexanetriol, 1,3,5-pentanetriol, polyether triols, and the like. Examples of the polyether triols include compounds obtained by addition polymerization of one or more monomers, such as ethylene oxide, propylene oxide, butylene oxide, amylene oxide, glycidyl ether, methyl glycidyl ether, t-butyl glycidyl ether, and phenyl glycidyl ether, using one or more initiators (e.g., compounds having three active hydrogens, such as glycerol, trimethylolpropane, and diethylenetriamine).

A specific example of the compound containing three or more isocyanate groups is a polyisocyanate compound that contains at least three isocyanate (NCO) groups per molecule. Examples of isocyanate compounds containing three or more functional groups in the present invention include biurets, nurates, and adducts obtained by modifying an isocyanate monomer having two isocyanate groups, such as an aromatic diisocyanate, aliphatic diisocyanate, aromatic aliphatic diisocyanate, or alicyclic diisocyanate.

Examples of aromatic diisocyanates include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, dianisidine diisocyanate, 4,4'-diphenyl ether diisocyanate, and the like.

Examples of aliphatic diisocyanates include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and the like.

Examples of aromatic aliphatic diisocyanates include xylylene diisocyanate, ω,ω'-diisocyanate-1,4-diethylbenzene, 1,4-tetramethylxylylene diisocyanate, 1,3-tetramethylxylylene diisocyanate, and the like.

Examples of alicyclic diisocyanates include 3-isocyanatomethyl-3,5,5-trimethylcyclohexyl isocyanate (also known as IPDI, isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis (cyclohexyl isocyanate), 1,4-bis(isocyanatomethyl)cyclohexane, and the like.

The biuret is a self-condensate with a biuret bond formed by self-condensation of an isocyanate monomer. Examples include a biuret of hexamethylene diisocyanate, and the like.

The narrate is a trimer of an isocyanate monomer. Examples include a trimer of hexamethylene diisocyanate, a trimer of isophorone diisocyanate, a trimer of tolylene diisocyanate, and the like.

The adduct is an isocyanate compound containing three or more functional groups that is obtained by reacting an isocyanate monomer described above with a low-molecular-weight compound containing three or more active hydrogens. Examples include a compound obtained by reacting trimethylolpropane with hexamethylene diisocyanate, a compound obtained by reacting trimethylolpropane with tolylene diisocyanate, a compound obtained by reacting trimethylolpropane with xylylene diisocyanate, a compound obtained by reacting trimethylolpropane with isophorone diisocyanate, and the like.

Chain extenders containing three or more functional groups include alcohols containing three or more hydroxyl groups, such as trimethylolpropane and pentaerythritol, which are listed in the explanation of the chain extender described above.

The coating layer in the present invention is preferably formed by an in-line coating method described later, using a water-based coating liquid. It is thus desirable that the urethane resin of the present invention has water solubility or water dispersibility. The phrase "water solubility or water dispersibility" means dispersing in water or an aqueous solution containing a water-soluble organic solvent in an amount of less than 50 mass %.

To impart water dispersibility to the urethane resin, a sulfonic acid (salt) group or a carboxylic acid (salt) group can be introduced (copolymerized) into the urethane molecular skeleton. In order to maintain moisture resistance, it is preferable to introduce a carboxylic acid (salt) group, which is weakly acidic. A nonionic group, such as a polyoxyalkylene group, can also be introduced.

To introduce a carboxylic acid (salt) group into the urethane resin, for example, a polyol compound containing a carboxylic acid group, such as dimethylolpropanoic acid or dimethylolbutanoic acid, is introduced as a polyol component (copolymerization component), and neutralization is performed using a salt-forming agent. Specific examples of salt-forming agents include ammonia; trialkylamines, such as trimethylamine, triethylamine, triisopropylamine, tri-n-propylamine, and tri-n-butylamine; N-alkylmorpholines, such as N-methylmorpholine and N-ethylmorpholine; and N-dialkylalkanolamines, such as N-dimethylethanolamine and N-diethylethanolamine. These may be used singly, or in a combination of two or more.

When a polyol compound containing a carboxylic acid (salt) group is used as a copolymerization component to impart water dispersibility, the molar percentage of the polyol compound containing a carboxylic acid (salt) group in the urethane resin is preferably 3 to 60 mol %, and more preferably 5 to 40 mol %, based on the entire polyisocyanate component of the urethane resin taken as 100 mol %. A molar percentage of 3 mol % or more is preferred because water dispersibility is obtained. A molar percentage of 60 mol % or less is preferred because water resistance is maintained, and wet-heat resistance is obtained.

The urethane resin according to the present invention may have a blocked isocyanate structure at one or more terminals thereof to improve toughness.

Crosslinking Agent

The crosslinking agent contained in the composition for forming the coating layer in the present invention is preferably a blocked isocyanate, more preferably a blocked isocyanate containing three or more functional groups, and particularly preferably a blocked isocyanate containing four or more functional groups. These blocked isocyanates are capable of improving blocking resistance when water adheres.

The lower limit of the NCO equivalent of the blocked isocyanate is preferably 100, more preferably 120, even more preferably 130, particularly preferably 140, and most preferably 150. An NCO equivalent of 100 or more is preferred because there is no risk of coating-film cracking. The upper limit of the NCO equivalent is preferably 500, more preferably 400, even more preferably 380, particularly preferably 350, and most preferably 300. An NCO equivalent of 500 or less is preferred because blocking resistance can be improved when water adheres.

The lower limit of the boiling point of the blocking agent of the blocked isocyanate is preferably 150° C., more preferably 160° C., even more preferably 180° C., particularly preferably 200° C., and most preferably 210° C. The higher the boiling point of the blocking agent, the more the volatilization of the blocking agent by application of heat is suppressed in the drying process after application of the coating liquid or in the film-forming process in the case of an in-line coating method, and the more the formation of minute irregularities on the coating surface is suppressed, thereby improving transparency of the film. The upper limit of the boiling point of the blocking agent is not particularly limited; about 300° C. seems to be the upper limit in terms of productivity. Since the boiling point is related to the molecular weight, it is preferable to use a blocking agent having a high molecular weight in order to increase the boiling point of the blocking agent. The blocking agent preferably has a molecular weight of 50 or more, more preferably 60 or more, and even more preferably 80 or more.

The upper limit of the dissociation temperature of the blocking agent is preferably 200° C., more preferably 180° C., even more preferably 160° C., particularly preferably 150° C., and most preferably 120° C. The blocking agent dissociates from the functional groups by application of heat in the drying process after application of the coating liquid, or in the film-forming process in the case of an in-line coating method, to produce regenerated isocyanate groups. Thus, the crosslinking reaction with the urethane resin and the like proceeds, and the adhesion is improved. When the temperature at which the blocking agent dissociates from the blocked isocyanate is equal to or lower than the above temperature, the dissociation of the blocking agent sufficiently proceeds, resulting in good adhesion and particularly good wet-heat resistance.

Examples of blocking agents having a dissociation temperature of 120° C. or less and a boiling point of 150° C. or more that can be used for the blocked isocyanate in the present invention include bisulfite-based compounds, such as sodium bisulfite; pyrazole-based compounds, such as 3,5-dimethylpyrazole, 3-methylpyrazole, 4-bromo-3,5-dimethylpyrazole, and 4-nitro-3,5-dimethylpyrazole; active methylene-based compounds, such as malonic acid diesters (dimethyl malonate, diethyl malonate, di-n-butyl malonate, and di-2-ethylhexyl malonate); methyl ethyl ketone; and triazole-based compounds, such as 1,2,4-triazole. Of these, the pyrazole-based compounds are preferred in terms of wet-heat resistance and yellowing resistance.

The polyisocyanate containing three or more functional groups that is a precursor of the blocked isocyanate in the present invention can be suitably obtained by introducing an isocyanate monomer. Examples include biurets, nurates, and adducts obtained by modifying an isocyanate monomer having two isocyanate groups, such as an aromatic diisocyanate, aliphatic diisocyanate, aromatic aliphatic diisocyanate, or alicyclic diisocyanate.

The biuret is a self-condensate with a biuret bond formed by self-condensation of an isocyanate monomer. Examples include a biuret of hexamethylene diisocyanate, and the like.

The narrate is a trimer of an isocyanate monomer. Examples include a trimer of hexamethylene diisocyanate, a trimer of isophorone diisocyanate, a trimer of tolylene diisocyanate, and the like.

The adduct is an isocyanate compound containing three or more functional groups that is obtained by reacting an isocyanate monomer with a low-molecular-weight compound containing three or more active hydrogens. Examples include a compound obtained by reacting trimethylolpropane with hexamethylene diisocyanate, a compound obtained by reacting trimethylolpropane with tolylene diisocyanate, a compound obtained by reacting trimethylolpropane with xylylene diisocyanate, a compound obtained by reacting trimethylolpropane with isophorone diisocyanate, and the like.

Examples of the isocyanate monomer include aromatic diisocyanates, such as 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 1,5-naphthylene diisocyanate, 1,4-naphthylene diisocyanate, phenylene diisocyanate, tetramethylxylylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, and 3,3'-dimethoxydiphenyl-4,4'-diisocyanate; aromatic aliphatic diisocyanates, such as xylylene diisocyanate; alicyclic diisocyanates, such as isophorone diisocyanate, 4,4-dicyclohexylmethane diisocyanate, and 1,3-bis(isocyanatomethyl) cyclohexane; and aliphatic diisocyanates, such as hexamethylene diisocyanate and 2,2,4-trimethylhexamethylene diisocyanate. The aliphatic and alicyclic diisocyanates and modified products thereof are preferred in terms of transparency, adhesion, and wet-heat resistance.

To impart water solubility or water dispersibility to the blocked isocyanate in the present invention, a hydrophilic group may be introduced into the precursor polyisocyanate. Examples of hydrophilic groups include (1) quaternary ammonium salts of dialkylamino alcohols, quaternary ammonium salts of dialkylaminoalkylamines, and the like; (2) sulfonic acid salts, carboxylic acid salts, phosphoric acid salts, and the like; and (3) polyethylene glycol, polypropylene glycol, and the like that are mono-endcapped with an alkyl group. The blocked isocyanate becomes (1) cationic, (2) anionic, and (3) nonionic when the hydrophilic moieties are individually introduced. Among these, anionic blocked isocyanates and nonionic blocked isocyanates are preferred because they are easily compatible with other water-soluble resins, many of which are anionic. Moreover, anionic blocked isocyanates have excellent compatibility with other resins; and nonionic blocked isocyanates have no ionic hydrophilic groups, and are thus preferable for improving wet-heat resistance.

The anionic hydrophilic groups are preferably those containing a hydroxyl group for introduction into the polyisocyanate, and a carboxylic acid group for imparting hydrophilic properties. Examples include glycolic acid, lactic acid, tartaric acid, citric acid, oxybutyric acid, oxyvaleric acid, hydroxypivalic acid, dimethylolacetic acid, dimethylolpropanoic acid, dimethylolbutanoic acid, and carboxylic acid group-containing polycaprolactone. To neutralize the carboxylic acid group, an organic amine compound is preferably used. Examples of organic amine compounds include ammonia; $C_{1-20}$ linear or branched primary, secondary, or tertiary amines, such as methylamine, ethylamine, propylamine, isopropylamine, butylamine, 2-ethylhexylamine, cyclohexylamine, dimethylamine, diethylamine, dipropylamine, diisopropylamine, dibutylamine, trimethylamine, triethylamine, triisopropylamine, tributylamine, and ethylenediamine; cyclic amines, such as morpholine, N-alkylmorpholine, and pyridine; hydroxyl group-containing amines, such as monoisopropanolamine, methylethanolamine, methylisopropanolamine, dimethylethanolamine, diisopropanolamine, diethanolamine, triethanolamine, diethylethanolamine, and triethanolamine; and the like.

The nonionic hydrophilic groups include polyethylene glycol and polypropylene glycol, both of which are mono-endcapped with an alkyl group, wherein the number of repeating units of the ethylene oxide and/or the propylene oxide is preferably 3 to 50, and more preferably 5 to 30. If the number of repeating units is small, the compatibility with resins may become poor, and the haze may increase. If the number of repeating units is large, the adhesion under high temperature and high humidity may decrease. To improve water dispersibility, nonionic, anionic, cationic, and amphoteric surfactants can be added to the blocked isocyanate of the present invention. Examples include nonionic surfactants, such as polyethylene glycol and polyhydric alcohol fatty acid esters; anionic surfactants, such as fatty acid salts, alkyl sulfuric acid esters, alkylbenzenesulfonic acid salts, sulfosuccinic acid salts, and alkyl phosphoric acid salts; cationic surfactants, such as alkylamine salts and alkylbetaine; amphoteric surfactants, such as carboxylic acid amine salts, sulfonic acid amine salts, and sulfuric acid ester salts; and the like.

The coating liquid may contain a water-soluble organic solvent in addition to water. For example, the coating liquid may contain the organic solvent used in the reaction; or the organic solvent used in the reaction may be removed, and another organic solvent may be added.

Polyester Resin

The polyester resin used to form the coating layer in the present invention may be linear; however, it is preferably a polyester resin containing a dicarboxylic acid and a diol with a branched structure as constituents. Examples of the dicarboxylic acid that mainly constitutes the polyester resin include terephthalic acid, isophthalic acid, and 2,6-naphthalenedicarboxylic acid. Other examples thereof include aliphatic dicarboxylic acids, such as adipic acid and sebacic acid; and aromatic dicarboxylic acids, such as terephthalic acid, isophthalic acid, phthalic acid, and 2,6-naphthalenedicarboxylic acid. The branched glycol is a branched alkyl group-containing diol. Examples include 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, 2,2-di-n-hexyl-1,3-propanediol, and the like.

In the preferred embodiment described above, the content of the branched glycol component in the polyester resin is preferably 10 mol % or more, and more preferably 20 mol % or more of the entire glycol component. A branched glycol component content of 10 mol % or less may increase crystallinity, resulting in decreased adhesion of the coating layer. The upper limit of the content of the branched glycol component in the entire glycol component is preferably 80 mol % or less, and more preferably 70 mass %. A branched glycol component content of 80 mol % or more may increase the concentration of oligomers as a by-product, affecting the transparency of the coating layer. As a glycol component other than the compounds mentioned above, ethylene glycol is most preferable. Diethylene glycol, propylene glycol, butanediol, hexanediol, 1,4-cyclohexanedimethanol, or the like may be used as long as the amount thereof is small.

As the dicarboxylic acid, which is a constituent of the polyester resin, terephthalic acid or isophthalic acid is most preferred. In addition to the above dicarboxylic acids, it is preferable to use 5-sulfoisophthalic acid or the like in the range of 1 to 10 mol % for copolymerization, in order to impart water dispersibility to the copolyester-based resin. Examples include sulfoterephthalic acid, 5-sulfoisophthalic acid, 5-sodium sulfoisophthalic acid, and the like. A polyester resin containing a dicarboxylic acid with a naphthalene skeleton may be used; however, in order to suppress a decrease in adhesion to UV ink, the amount thereof is preferably 5 mol % or less of the entire carboxylic acid component, or the dicarboxylic acid with a naphthalene skeleton may not be used.

The lower limit of the content of the crosslinking agent is preferably 5 mass %, more preferably 7 mass %, and even more preferably 10 mass %, based on the total solids content of the polyester resin, the urethane resin with a polycarbonate structure, and the crosslinking agent in the coating liquid taken as 100 mass %. A crosslinking agent content of 5 mass % or more is preferred because blocking resistance can be improved when water adheres. The upper limit of the content of the crosslinking agent is preferably 50 mass %, more preferably 40 mass %, even more preferably 35 mass %, and most preferably 30 mass %. A crosslinking agent content of 50 mass % or less is preferred because adhesion to UV ink is improved.

The lower limit of the content of the urethane resin with a polycarbonate structure is preferably 5 mass %, based on the total solids content of the polyester resin, the urethane resin with a polycarbonate structure, and the crosslinking agent in the coating liquid taken as 100 mass %. A urethane resin content of 5 mass % or more is preferred because adhesion to UV ink can be improved. The upper limit of the content of the urethane resin with a polycarbonate structure is preferably 50 mass %, more preferably 40 mass %, even more preferably 30 mass %, and most preferably 20 mass %. A urethane resin content of 50 mass % or less is preferred because blocking resistance can be improved when water adheres.

The lower limit of the content of the polyester resin is preferably 10 mass %, more preferably 20 mass %, even more preferably 30 mass %, particularly preferably 35 mass %, and most preferably 40 mass %, based on the total solids content of the polyester resin, the urethane resin, and the crosslinking agent in the coating liquid taken as 100 mass %. A polyester resin content of 10 mass % or more is preferred because the adhesion between the coating layer and the polyester film substrate is good. The upper limit of the content of the polyester resin is preferably 70 mass %, more preferably 67 mass %, even more preferably 65 mass %, particularly preferably 62 mass %, and most preferably 60 mass %. A polyester resin content of 70 mass % or less is preferred because the wet-heat resistance after UV ink processing is good.

Additives

The coating layer in the present invention may contain known additives, such as surfactants, antioxidants, heat-resistant stabilizers, weathering stabilizers, ultraviolet absorbers, organic lubricants, pigments, dyes, organic or inorganic particles, antistatic agents, and nucleating agents, in the range where the effect of the present invention is not impaired.

In the present invention, it is particularly preferable that the composition for forming the coating layer further contains an antistatic agent to prevent the occurrence of static electricity problems during various processes for labeling the resulting film, such as in adhesive coating, printing, cutting, and punching. Any antistatic agent may be used as long as the effect of the present invention is not impaired. The antistatic agent may be those commonly used as an antistatic agent for coating (e.g., quaternary ammonium salt-based antistatic agents), carbon black in particulate form, metal powders (e.g., nickel and copper), metal oxides (e.g., tin oxide and zinc oxide), fibrous brass, fiber coated with metal (e.g., stainless steel and aluminum), conductive fillers (e.g., flake graphite, aluminum flakes, and copper flakes), and conductive polymers, such as sulfonated polyaniline and polypyrrole.

To reduce the glossiness on the surface of the coating layer, the coating layer may also contain inert particles.

Examples of the inert particles include particles of inorganic compounds such as titanium oxide, barium sulfate, calcium carbonate, calcium sulfate, silica, alumina, talc, kaolin, clay, calcium phosphate, mica, hectorite, zirconia, tungsten oxide, lithium fluoride, or calcium fluoride; particles of organic polymers such as polystyrene, polyacrylic, melamine, benzoguanamine, silicone resin; and the like. These may be used singly, or in a combination of two or more.

The average particle size of the inert particles is preferably 0.1 to 2.4 μm, and more preferably 0.3 to 2.0 μm. If the average particle size of the inert particles is 0.04 μm or less, the glossiness on the film surface can increase. On the other hand, if it exceeds 2.4 μm, the particles tend to drop out of the coating layer, resulting in powder falling.

The measurement method for the average particle size is as described above. Further, the shape of the particles is not particularly limited as long as it satisfies the object of the present invention, and spherical particles and non-spherical particles having an irregular shape can be used. The particle size of particles having an irregular shape can be calculated as an equivalent circle diameter.

To increase the glossiness on the surface of the coating layer, it is also preferable for the coating layer to not contain particles.

Production of White Laminated Polyester Film

The method for producing the white laminated polyester film of the present invention is not particularly limited, and may be any method. For example, a common method may be used that comprises melting and extruding a mixture comprising the above components to be molded into a sheet to form an unstretched film, and stretching the unstretched film.

In terms of the white laminated polyester film of the present invention, a thermoplastic resin that is incompatible with polyester resin is dispersed in a polyester resin in the step of melting and extruding the film materials for molding. In the Examples of the present invention, the polyester resin and the thermoplastic resin incompatible with polyester resin supplied in pellet form were used. However, they are not limited to this.

Starting materials to be fed into an extruder so as to be melted and molded into a film form are prepared by mixing these resins in pellet form according to the desired formulation. However, when a polyester resin and a polyolefin resin, whose specific gravities greatly differ from each other, are used as the starting materials for the cavity-containing polyester film of the substrate of the present invention, it is preferable to strive to prevent segregation in the process of feeding pellets that have been mixed to an extruder. A suitable method for preventing segregation may be, for example, a method in which some or all of the starting material resins in combination are kneaded and pelletized to give master batch pellets in advance. This method was used in the Examples of the present invention; however, the method is not particularly limited to this as long as the effect of the present invention is not impaired.

In extrusion of such mixtures with an incompatible resin, even after resins are mixed and finely dispersed in the molten state, resins have properties to act to reduce the interfacial energy of the resins, forming aggregates again. This phenomenon causes coarse dispersion of a cavity-forming agent in extrusion molding into an unstretched film, which prevents desired physical properties from being achieved.

To avoid the above phenomenon, it is preferable to finely disperse a cavity-forming agent in advance using a twin-screw extruder, which has a higher mixing effect, when the film of the present invention is formed by molding. If this is difficult, it is also preferable to feed the starting resins from an extruder to a feed block or a die through a static mixer, as an auxiliary means. The static mixer for use may be a static mixer, an orifice, or the like. However, caution should be taken when these methods are used since thermally degraded resin is caused to be retained in the melt line.

The incompatible resin, once dispersed in the form of fine particles in a polyester resin, tends to aggregate again with time in the molten state under low-shear conditions. The fundamental solution for this is to reduce the retention time in the melt line from the extruder to the die. In the present invention, the retention time in the melt line is preferably 30 minutes or less, and more preferably 15 minutes or less.

The conditions for stretching and orientation of the unstretched film obtained as described above are closely related to the physical properties of the film. Below, the stretching and orientation conditions are described in view of a most commonly used sequential biaxial stretching method, in particular, a method comprising stretching an unstretched film in the longitudinal direction and then in the width direction, as an example.

In a longitudinal stretching step, a film is stretched 2.5 to 5.0-fold in the longitudinal direction on a roll heated to 80 to 120° C. to obtain an uniaxially stretched film. Heating may be performed by a method that uses a heating roll, a method that uses a non-contact heating means, or a combination of these methods. Next, the uniaxially stretched film is introduced into a tenter and stretched 2.5 to 5.0-fold in the width direction at a temperature equal to or lower than (Tm-10° C.). The term "Tm" as used here represents the melting point of polyester.

The above biaxially stretched film is subjected to heat treatment as necessary. The heat treatment is preferably performed in a tenter at a temperature within the range of (Tm-60° C.) to Tm.

The coating layer may be formed after the production of the film or in the production process. In particular, in terms of productivity, the coating layer is preferably formed at any stage of the production process of the film; i.e., the coating layer is preferably formed by applying the coating liquid to at least one surface of the unstretched or uniaxially stretched PET film.

The coating liquid may be applied to the PET film by using a known method. Examples of the method include reverse roll coating, gravure coating, kiss coating, die coating, roll brush coating, spray coating, air knife coating, wire bar coating, a pipe doctor method, impregnation coating, curtain coating, and the like. These methods may be used singly or in combination for application of the coating liquid.

In the present invention, the thickness of the coating layer can be suitably determined within the range of 0.001 to 2.00 μm; however, in order to achieve both processability and adhesion, the thickness is preferably within the range of 0.01 to 1.00 μm, more preferably 0.02 to 0.80 μm, and even more preferably 0.05 to 0.50 μm. A coating layer thickness of 0.001 μm or more is preferred due to good adhesion. A coating layer thickness of 2.00 μm or less is preferred because blocking is less likely to occur.

Until now, many polyester films with a coating layer that contains, for example, a single resin selected from a polyester resin, a polyurethane resin, and an acrylic resin; a mixture of two or more of these resins; or a mixture of one or more of these resins with a specific crosslinking agent (e.g., melamine and isocyanate) have been found to have satisfactory blocking resistance when left in an ordinary environment containing water vapor. However, when films are transported between outdoors and indoors in winter, dew condensation may occur, and liquid water can adhere to the surface of the films and the coating layers. In this case, polyester films with a coating layer that contains a polyester resin, a polyurethane resin, an acrylic resin, and a crosslinking agent suffer from blocking. In contrast, the white laminated polyester film of the present invention has resistance to blocking when left in an ordinary environment containing water vapor. Additionally, readily adhesive polyester films that are transported between indoors and outdoors in winter are unlikely to suffer from blocking even when liquid water adheres to the surface of the films or the coating layers due to the occurrence of dew condensation as a result of temperature changes in environment.

EXAMPLES

Next, the present invention is described below in more detail with reference to Examples and Comparative Examples. However, the present invention is not limited to the following Examples. First, the evaluation methods used in the present invention are explained below.

(1) Evaluation of Blocking Resistance when Water Adheres

Each of the readily adhesive polyester films produced in the Examples below was cut into pieces with a width of 10 cm and a length of 1.5 cm. A film with a width of 1.5 cm and a length of 1.5 cm was stacked on one end of the coating layer surface of each cut film. Then, 0.03 g of water droplets were dropped at an end of the coating layer surface on the opposite side. Thereafter, another cut film with a width of 10 cm and a length of 1.5 cm was stacked so that the coating layer surfaces of the cut films face each other, and a roller was applied evenly from the side where water droplets were dropped to the side where a film was stacked so as not to allow air to enter. The samples were then placed in an oven (50° C.) for 24 hours. The coating layers of the films were then detached, and the detached state was evaluated according to the following criteria.

A: The coating layers can easily be detached from each other, without any transfer of one coating layer to another.

B: The coating layers are basically maintained, but the surface layer of one coating layer is partially transferred to the opposing surface.

C: The two films are tightly adhered to each other in such a manner that the films cannot be detached from each other; or, even if the two films can be detached from each other, cleavage in the film substrates occurs.

(2) UV Ink Adhesion

A print was formed on a coating layer of a laminated polyester film using a UV ink (produced by T&K TOKA Co., Ltd., trade name Best Cure UV161 Indigo S) with a printability tester (produced by Akira Seisakusho Co., Ltd., trade name: RI Tester). Subsequently, the film coated with the ink layer was irradiated with 40 mJ/cm$^2$ of UV light using a high-pressure mercury lamp to thereby cure the UV-curable ink. Then, cellophane adhesive tape produced by Nichiban Co., Ltd., (CT405AP-24) was cut into a piece with a width of 24 mm and a length of 50 mm and adhered completely to the ink layer surface with a handheld rubber roller so as not to allow air to enter. Subsequently, the cellophane adhesive tape was vertically peeled off, and the area with the remaining printing layer was observed in the region of 24 mm×50 mm and evaluated according to the following criteria.

A: The area with the remaining printing layer is 99% or more of the total region.

B: The area with the remaining printing layer is 90% or more but less than 99% of the total region.

C: The area with the remaining printing layer is less than 90% of the total region.

(3) Method for Measuring Number Average Molecular Weight of Polycarbonate Polyol When a urethane resin with a polycarbonate structure is subjected to proton nuclear magnetic resonance spectroscopy ($^1$H-NMR), a peak derived from a methylene group adjacent to an OCOO bond is observed around 4.1 ppm. Further, in a field higher than this peak by about 0.2 ppm, a peak derived from a methylene group adjacent to a urethane bond formed by a reaction of polyisocyanate and polycarbonate polyol is also observed. The number average molecular weight of polycarbonate polyol was calculated from integral values of these two kinds of peaks and molecular weights of the monomers constituting the polycarbonate polyol.

(4) Apparent Density

A film was cut into four square sheets (5.00 cm×5.00 cm) for use as samples. The four obtained sample sheets were stacked on each other, and the thickness was measured with a micrometer to four significant digits at 10 points to determine the average value of the thicknesses of the stacked sample sheets). The average value was divided by 4 and rounded off to three decimal places to determine the average film thickness (t: μm) per sheet. The mass of the four sample sheets (w: g) was measured to four significant digits with an automatic balance, and the apparent density was determined according to the following formula. The apparent density was rounded to three significant digits.

$$\text{Apparent density (g/cm}^3) = w \times 10^4/(5.00 \times 5.00 \times t \times 4)$$

(5) Optical Density

For the opacity of polyester film, the transmittance of light through a G filter was measured with a Macbeth densitometer TR-927, and the optical density was calculated from the obtained light transmittance, which was used as an index of opacity. The optical density was expressed as the logarithm (log 10) of the reciprocal of light transmission (range: 0 to 100%). The higher the value of the optical density, the higher the opacity.

(6) L-Value and b-Value

The color L-value and color b-value of reflection were measured with a color difference meter (ZE6000, produced by Nippon Denshoku Industries Co., Ltd.) in accordance with JIS-8722.

Polymerization of Urethane Resin A-1 Having Polycarbonate Structure 27.5 parts by mass of hydrogenated m-xylylene diisocyanate, 6.5 parts by mass of dimethylolpropanoic acid, 60 parts by mass of polyhexamethylene carbonate diol having a number average molecular weight of 1800, 6 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. Subsequently, 5 parts by mass of trimethylol propane was added. The resulting mixture was stirred at 75° C. in a nitrogen atmosphere for 1 hour, and the reaction mixture was confirmed to have reached a predetermined amine equivalent. After the temperature of this reaction mixture was reduced to 40° C., 5.17 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min-, the polyurethane prepolymer solution was added to obtain an aqueous dispersion. Acetone and a portion of water were then removed under reduced pressure, thus preparing a water-dispersible urethane resin solution (A-1) with a solids content of 34 mass %.

Polymerization of Urethane Resin A-2 Having Polycarbonate Structure 25 parts by mass of 4,4-dicyclohexylmethane diisocyanate, 5 parts by mass of dimethylolpropanoic acid, 52 parts by mass of polyhexamethylene carbonate diol having a number average molecular weight of 2600, 6 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 18 parts by mass of a polyisocyanate compound having an isocyanurate structure (Duranate TPA, produced by Asahi Kasei Chemicals Corporation, trifunctional compound) prepared using hexamethylene diisocyanate as a starting material was added. The resulting mixture was stirred in a nitrogen atmosphere at 75° C. for 1 hour, and the reaction mixture was confirmed to have reached the predetermined amine equivalent. The temperature of the reaction mixture was then reduced to 50° C., and 8 parts by mass of methyl ethyl ketoxime was added dropwise. After the temperature of the reaction mixture was reduced to 40° C., 5.17 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min⁻¹, the polyurethane prepolymer solution was added to obtain an aqueous dispersion. Acetone and a portion of water were then removed under reduced pressure, thus preparing a water-dispersible urethane resin solution (A-2) with a solids content of 35 mass %.

Polymerization of Urethane Resin A-3 Having Polycarbonate Structure 22 parts by mass of 4,4-dicyclohexylmethane diisocyanate, 20 parts by mass of polyethylene glycol monomethyl ether having a number average molecular weight of 700, 53 parts by mass of polyhexamethylene carbonate diol having a number average molecular weight of 2100, 5 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 16 parts by mass of a polyisocyanate compound having an isocyanurate structure (Duranate TPA, produced by Asahi Kasei Chemicals Corporation, trifunctional compound) prepared using hexamethylene diisocyanate as a starting material was added. The resulting mixture was stirred in a nitrogen atmosphere at 75° C. for 1 hour, and the reaction mixture was confirmed to have reached the predetermined amine equivalent. The temperature of the reaction mixture was then reduced to 50° C., and 7 parts by mass of methyl ethyl ketoxime was added dropwise. After the temperature of the reaction mixture was reduced to 40° C., a polyurethane prepolymer solution was obtained. Subsequently, 450 g of water was added to a reaction vessel equipped with a homodisper capable of high-speed stirring, and the temperature was adjusted to 25° C. While mixing and stirring were performed at 2000 min⁻¹, the polyurethane prepolymer solution was added to obtain an aqueous dispersion. Acetone and a portion of water were then removed under reduced pressure to obtain a water-dispersible urethane resin solution (A-3) with a solids content of 35 mass %.

Polymerization of Urethane Resin A-4 Having Polycarbonate Structure 22 parts by mass of 4,4-dicyclohexylmethane diisocyanate, 3 parts by mass of dimethylol butanoic acid, 73 parts by mass of polyhexamethylene carbonate diol having a number average molecular weight of 2000, 2 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 4 parts by mass of trimethylolpropane was added. The resulting mixture was stirred in a nitrogen atmosphere at 75° C. for 1 hour, and the reaction mixture was confirmed to have reached the predetermined amine equivalent. Subsequently, after the temperature of the reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min⁻¹, the polyurethane prepolymer solution was added to obtain an aqueous dispersion. Acetone and a portion of water were then removed under reduced pressure, thus preparing a water-dispersible urethane resin solution (A-4) with a solids content of 34 mass %.

Polymerization of Urethane Resin A-5 Having Polycarbonate Structure 47 parts by mass of 4,4-dicyclohexylmethane diisocyanate, 21 parts by mass of polyethylene glycol monomethyl ether having a number average molecular weight of 700, 20 parts by mass of polyhexamethylene carbonate diol having a number average molecular weight of 1200, 12 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 4 parts by mass of trimethylolpropane was added. The resulting mixture was stirred in a nitrogen atmosphere at 75° C. for 1 hour, and the reaction mixture was confirmed to have reached the predetermined amine equivalent. Subsequently, after the temperature of this reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min$^{-1}$, the polyurethane prepolymer solution was added to obtain an aqueous dispersion. Acetone and a portion of water were then removed under reduced pressure to obtain a water-dispersible urethane resin solution (A-5) with a solids content of 34 mass %.

Polymerization of Urethane Resin A-6 Having Polycarbonate Structure 23.5 parts by mass of 4,4-dicyclohexylmethane diisocyanate, 4.5 parts by mass of dimethylol butanoic acid, 70 parts by mass of polyhexamethylene carbonate diol having a number average molecular weight of 2000, 2 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, after the temperature of the reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min$^{-1}$, the polyurethane prepolymer solution was added to obtain an aqueous dispersion. Acetone and a portion of water were then removed under reduced pressure, thus preparing a water-dispersible urethane resin solution (A-6) with a solids content of 34 mass %.

Polymerization of Urethane Resin A-7 Having Polycarbonate Structure 27.5 parts by mass of hydrogenated m-xylylene diisocyanate, 6.5 parts by mass of dimethylol propanoic acid, 60 parts by mass of polyhexamethylene carbonate diol having a number average molecular weight of 1800, 6 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. After the temperature of the reaction mixture was reduced to 40° C., 5.17 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min$^{-1}$, the polyurethane prepolymer solution was added to obtain an aqueous dispersion. Acetone and a portion of water were then removed under reduced pressure, thus preparing a water-dispersible urethane resin solution (A-7) with a solids content of 34 mass %.

Polymerization of Urethane Resin A-8 Having Polycarbonate Structure 400 by mass of polycarbonate polyol comprising 1,6-hexanediol and diethyl carbonate and having a number average molecular weight of 2000, 10.4 parts by mass of neopentyl glycol, 58.4 parts by mass of isophorone diisocyanate, 74.3 parts by mass of dimethylol butanoic acid, and 320 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. After the temperature of the reaction mixture was reduced to 40° C., isophoronediamine was added to obtain a polyurethane prepolymer solution. Subsequently, 1200 g of water was added to a reaction vessel equipped with a homodisper capable of high-speed stirring, and the temperature was adjusted to 25° C. While mixing and stirring were performed at 2000 min$^{-1}$, the polyurethane prepolymer solution was added to obtain an aqueous dispersion. Acetone and a portion of water were then removed under reduced pressure, thus preparing a water-dispersible urethane resin solution (A-8) with a solids content of 34 mass %.

Polymerization of Urethane Resin A-9 Having Polycarbonate Structure 50 parts by mass of 4,4-dicyclohexylmethane diisocyanate, 21 parts by mass of polyethylene glycol monomethyl ether having a number average molecular weight of 700, 35 parts by mass of polyhexamethylene carbonate diol having a number average molecular weight of 1200, 13 parts by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 1.2 parts by mass of trimethylol propane was added. The resulting mixture was stirred at 75° C. in a nitrogen atmosphere for 1 hour, and the reaction mixture was confirmed to have reached the predetermined amine equivalent. After the temperature of this reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min-, the polyurethane prepolymer solution was added to obtain an aqueous dispersion. Acetone and a portion of water were then removed under reduced pressure, thus preparing a water-dispersible urethane resin solution (A-9) with a solids content of 34 mass %.

Polymerization of Polycarbonate Polyol Component-Free Urethane Resin A-10

75 parts by mass of a polyester polyol containing terephthalic acid, isophthalic acid, ethylene glycol, and neopentyl glycol as components and having a molecular weight of 5000, 30 parts by mass of hydrogenated m-xylene diisocyanate, 7 parts by mass of ethylene glycol, 6 parts by mass of dimethylol propionic acid, and 84.00 parts by mass of acetone as a solvent were added. The resulting mixture was stirred at 75° C. in a nitrogen atmosphere for 3 hours, and the reaction mixture was confirmed to have reached the predetermined amine equivalent. Subsequently, after the temperature of the reaction mixture was reduced to 40° C., 5.17 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min⁻¹, the polyurethane prepolymer solution was added to obtain an aqueous dispersion. Acetone and a portion of water were then removed under reduced pressure, thus preparing a water-dispersible urethane resin solution (A-10) with a solids content of 34 mass %.

Polymerization of Polycarbonate Polyol Component-Free Urethane Resin A-11

54 parts by mass of 4,4-dicyclohexylmethane diisocyanate, 38 parts by mass of a polyester polyol containing ethylene glycol and adipic acid as components and having a number average molecular weight of 1500, 0.8 parts by mass of trimethylolpropane, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached the predetermined amine equivalent. Subsequently, 4 parts by mass of sodium hydrogen sulfate was added. The resulting mixture was stirred at 75° C. in a nitrogen atmosphere for one hour, the reaction mixture was confirmed to have reached the predetermined amine equivalent. After the temperature of this reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. While mixing and stirring were performed at 2000 min⁻¹, the polyurethane prepolymer solution was added to obtain an aqueous dispersion. Acetone and a portion of water were then removed under reduced pressure, thus preparing a water-dispersible urethane resin solution (A-11) with a solids content of 34 mass %.

Polymerization of Blocked Isocyanate Crosslinking Agent B-1

66.04 parts by mass of a polyisocyanate compound having an isocyanurate structure (Duranate TPA, produced by Asahi Kasei Chemicals Corporation) prepared using hexamethylene diisocyanate as a starting material, and 17.50 parts by mass of N-methylpyrrolidone were placed in a flask equipped with a stirrer, a thermometer, and a reflux condenser tube. 95 parts by mass of 3,5-dimethylpyrazole (dissociation temperature: 120° C., boiling point: 218° C.) was added dropwise. The resulting mixture was maintained in a nitrogen atmosphere at 70° C. for 1 hour, and 30 parts by mass of dimethylolpropanoic acid was then added dropwise. After the reaction mixture was subjected to infrared spectrum measurement and the disappearance of the isocyanate group absorption peak was confirmed, 5.59 parts by mass of N,N-dimethylethanolamine and 132.5 parts by mass of water were added, thus obtaining an aqueous blocked polyisocyanate dispersion (B-1) with a solids content of 40 mass %. The blocked isocyanate crosslinking agent had four functional groups, and an NCO equivalent of 280.

Polymerization of Blocked Isocyanate Crosslinking Agent B-2

100 parts by mass of a polyisocyanate compound having an isocyanurate structure (Duranate TPA, produced by Asahi Kasei Chemicals Corporation) prepared using hexamethylene diisocyanate as a starting material, 55 parts by mass of propylene glycol monomethyl ether acetate, and 30 parts by mass of polyethylene glycol monomethyl ether (average molecular weight: 750) were placed in a flask equipped with a stirrer, a thermometer, and a reflux condenser tube. The resulting mixture was maintained in a nitrogen atmosphere at 70° C. for 4 hours. The temperature of the reaction mixture was then reduced to 50° C., and 47 parts by mass of methyl ethyl ketoxime was added dropwise. After the reaction mixture was subjected to infrared spectrum measurement and the disappearance of the isocyanate group absorption peak was confirmed, 210 parts by mass of water was added, thus obtaining an oxime-blocked isocyanate crosslinking agent (B-2) with a solids content of 40 mass %. The blocked isocyanate crosslinking agent had three functional groups, and an NCO equivalent of 170.

Polymerization of Carbodiimide B-3

168 parts by mass of hexamethylene diisocyanate and 220 parts by mass of polyethylene glycol monomethyl ether (M400, average molecular weight: 400) were placed in a flask equipped with a stirrer, a thermometer, and a reflux condenser and stirred at 120° C. for 1 hour. Further, 26 parts by mass of 4,4'-dicyclohexylmethane diisocyanate and 3.8 parts by mass of 3-methyl-1-phenyl-2-phosphorene-1-oxide (2 mass % of total isocyanates) as a carbodiimidating catalyst were added. The resulting mixture was further stirred in a stream of nitrogen at 185° C. for 5 hours. The reaction mixture was subjected to infrared spectrum measurement, and the disappearance of an absorption peak at a wavelength of 220 to 2300 cm⁻¹ was confirmed. After the reaction mixture was allowed to cool to 60° C., 567 parts by mass of ion exchange water was added. An aqueous carbodiimide resin solution (B-3) with a solids content of 40 mass % was thus obtained.

Polymerization of Blocked Isocyanate Crosslinking Agent B-4

After 33.6 parts by mass of hexamethylene diisocyanate was added to 200 parts by mass of a polyester (molecular weight: 2000) of a 2-mol ethylene oxide adduct of bisphenol A and maleic acid, a reaction was allowed to proceed at 100° C. for 2 hours. Subsequently, the temperature of the reaction system was once reduced to 50° C., and 73 parts by mass of an aqueous 30% sodium bisulfite solution was added. The resulting mixture was stirred at 45° C. for 60 minutes, and then diluted with 718 parts by mass of water, thus obtaining an aqueous blocked polyisocyanate dispersion (B-1) with a solids content of 20 mass %. The blocked isocyanate crosslinking agent had two functional groups, and an NCO equivalent of 1300.

Polymerization of Polyester Resin C-1

194.2 parts by mass of dimethyl terephthalate, 184.5 parts by mass of dimethyl isophthalate, 14.8 parts by mass of dimethyl-5-sodium sulfoisophthalate, 233.5 parts by mass of diethylene glycol, 136.6 parts by mass of ethylene glycol, and 0.2 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Subsequently, the temperature was raised to 255° C., and the pressure of the reaction system was gradually reduced. A reaction was then performed at a reduced pressure of 30 Pa for one hour and a half, thus obtaining a copolyester resin (C-1). The obtained copolyester resin (C-1) was pale yellow and transparent. The reduced viscosity of the copolyester resin (C-1) was measured to be 0.70 dl/g. The glass transition temperature as measured by DSC was 40° C.

Preparation of Aqueous Polyester Dispersion Cw-1

25 parts by mass of the polyester resin (C-1) and 10 parts by mass of ethylene glycol n-butyl ether were placed in a reactor equipped with a stirrer, a thermometer, and a reflux condenser. The resulting mixture was heated at 110° C. and stirred to dissolve the resin. After the resin was completely dissolved, 65 parts by mass of water was gradually added to the polyester solution while stirring. After the addition, the resulting mixture was cooled to room temperature while stirring, thus preparing a milky-white aqueous polyester dispersion (Cw-1) with a solids content of 25 mass %.

Polymerization of Polyester Resin C-2

342.0 parts by mass of dimethyl 2,6-naphthalene dicarboxylate, 35.0 parts by mass of dimethyl terephthalate, 35.5 parts by mass of dimethyl-5-sodium sulfoisophthalate, 198.6 parts by mass of ethylene glycol, 118.2 parts by mass of 1,6-hexanediol, and 0.4 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Further, 60.7 parts by mass of sebacic acid was added, and an esterification reaction was performed. Subsequently, the temperature was raised to 255° C., and the pressure of the reaction system was gradually reduced. A reaction was then performed at a reduced pressure of 30 Pa for one hour and a half, thus obtaining a copolyester resin (C-2). The obtained copolyester resin was pale yellow and transparent.

Preparation of Aqueous Polyester Dispersion Cw-2

25 parts by mass of the copolyester resin (C-2) and 15 parts by mass of ethylene glycol n-butyl ether were placed in a reactor equipped with a stirrer, a thermometer, and a reflux condenser. The resulting mixture was heated at 110° C. and stirred to dissolve the resin. After the resin was completely dissolved, 55 parts by mass of water was gradually added to the polyester solution while stirring. After the addition, the resulting mixture was cooled to room temperature while stirring, thus preparing a milky-white aqueous polyester dispersion (Cw-2) with a solids content of 25 mass %.

Polymerization of Polyester Resin C-3

194.2 parts by mass of dimethyl terephthalate, 184.5 parts by mass of dimethyl isophthalate, 14.8 parts by mass of dimethyl-5-sodium sulfoisophthalate, 185 parts by mass of neopentyl glycol, 188 parts by mass of ethylene glycol, and 0.2 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Subsequently, the temperature was raised to 255° C., and the pressure of the reaction system was gradually reduced. A reaction was then performed at a reduced pressure of 30 Pa for one hour and a half, thus obtaining a copolyester resin (C-3). The obtained copolyester resin (C-3) was pale yellow and transparent. The reduced viscosity of the copolyester resin (C-3) was measured to be 0.40 dl/g. The glass transition temperature as measured by DSC was 65° C.

Preparation of Aqueous Polyester Dispersion Cw-3

25 parts by mass of the polyester resin (C-3) and 10 parts by mass of ethylene glycol n-butyl ether were placed in a reactor equipped with a stirrer, a thermometer, and a reflux condenser. The resulting mixture was heated at 110° C. and stirred to dissolve the resin. After the resin was completely dissolved, 65 parts by mass of water was gradually added to the polyester solution while stirring. After the addition, the resulting mixture was cooled to room temperature while stirring, thus preparing a milky-white aqueous polyester dispersion (Cw-3) with a solids content of 25 mass %.

Example 1

(1) Preparation of Coating Liquid

The following coating components were mixed in a mixed solvent of water and isopropanol to prepare a coating liquid having a mass ratio of urethane resin solution (A-1)/crosslinking agent (B-1)/aqueous polyester dispersion (Cw-1) of 25/26/49 based on solids content.

| | |
|---|---|
| Urethane resin solution (A-1) | 6.30 parts by mass |
| Crosslinking agent (B-1) | 5.50 parts by mass |
| Aqueous polyester dispersion (Cw-1) | 17.00 parts by mass |
| Particles (silica particles with solids an average particle size of 0.45 μm, content concentration: 40.00 mass %) | 23.00 parts by mass |
| Surfactant (silicone-based surfactant, solids content concentration: 10 mass %) | 0.15 parts by mass |

(2) Production of White Laminated Polyester Film Preparation of Master Pellets 60 mass % of a polymethylpentene resin (DX820, produced by Mitsui Chemicals, Inc.) having a melt viscosity ($\eta$O) of 1,300 poise, 20 mass % of a polystyrene resin (G797N, produced by Japan Polystyrene Inc.) having a melt viscosity ($\eta$S) of 3,900 poise, and 20 mass % of a polypropylene resin (J104WC, produced by Grand Polymer Co., Ltd.) having a melt viscosity of 2,000 poise were mixed in pellet form. The resulting mixture was fed into a vented twin-screw extruder whose temperature had been adjusted to 285° C. and prekneaded. This molten resin was continuously fed into a vented single-screw kneader, kneaded, and extruded, and the resulting strand was cooled and cut to thus prepare master pellets (M1) as a cavity-forming agent.

Further, a mixture of 50 mass % of a polyethylene terephthalate resin having an intrinsic viscosity of 0.62 dl/g produced by a known method and 50 mass % of anatase titanium dioxide particles having an average particle size of 0.3 μm (TA-300, produced by Fuji Titanium Industry Co., Ltd.) was fed into a vented twin-screw extruder and prekneaded. This molten resin was continuously fed into a vented single-screw kneader, kneaded, and extruded. The resulting strand was cooled and cut to thus prepare titanium-dioxide-containing master pellets (M2).

Preparation of Film Material 81 mass % of the polyethylene terephthalate resin having an intrinsic viscosity of 0.62 dl/g mentioned above, the resin having been vacuum dried at 140° C. for 8 hours, 9 mass % of the master pellets (M1), the pellets having been vacuum dried at 90° C. for 4 hours, and 10 mass % of the master pellets (M2) were mixed in pellet form to thus obtain a film material (C1).

Preparation of Unstretched Film

The film material (C1) was fed to an extruder for layer B, whose temperature had been adjusted to 285° C. Separately, a mixture of 70 mass % of the same polyethylene terephthalate resin as that used for the film material (C1), and 30 mass % of the master pellets (M2) was fed to an extruder for layer A, whose temperature had been adjusted to 290° C. The molten resin discharged from the extruder for layer B was discharged through an orifice and the resin discharged from the extruder for layer A was discharged through a static mixer; the resins were then introduced to a feed block in which a layer formed of the film material (C1) (layer B) and a layer formed of the polyethylene terephthalate resin and the master pellets (M2) (layer A) were stacked in the order of layer A, layer B, and layer A.

The molten resins were coextruded in a sheet form from a T-die onto a cooling roll, whose temperature had been adjusted to 25° C., and adhered to and solidified on the roll by electrostatic application to form an unstretched film having a thickness of 510 μm. The discharge amount of each extruder was adjusted so that the thickness ratio of the layers was 1:8:1. The molten resins were retained in the melt line for about 12 minutes, and the shear rate obtained from the T-die was about 150/sec.

Preparation of Biaxially Stretched Film

The resulting unstretched film was uniformly heated to 65° C. using a heating roll and stretched 3.4 times in the longitudinal direction between two pairs of nip rolls having different peripheral speeds (low-speed rolls: 2 m/min, high-speed rolls: 6.8 m/min). As auxiliary heaters for the film, infrared heaters equipped with a metal reflective film (rated output: 20 W/cm) were disposed for heating in the middle of the nip rolls so that the heaters faced both surfaces of the film at a position 1 cm from the film surface. On one surface of the uniaxially stretched film obtained in this manner, the coating liquid was applied by reverse kiss coating so that the thickness of the resin solids content before stretching was 0.9 μm. After application, the resulting film was guided to a tenter, heated to 150° C. while drying, and stretched 3.7-fold in the transverse direction. With the width fixed, the film was heated at 220° C. for 5 seconds, and further relaxed by 4% at 200° C. in the width direction, thus obtaining a white laminated polyester film having a thickness of 50 μm. The film had an apparent density of 1.10 g/cm$^3$ and an optical density of 0.8. Table 1 shows the evaluation results.

Example 2

A white laminated polyester film was obtained in the same manner as in Example 1, except that the urethane resin in the coating liquid was changed to urethane resin (A-2), and the aqueous polyester dispersion was changed to aqueous polyester dispersion (Cw-3).

Example 3

(1) Preparation of Coating Liquid

A coating liquid was produced in the same manner as Example 1, except that urethane resin was changed to urethane resin (A-3).

(2) Production of White Laminated Polyester Film Preparation of Master Pellets

A mixture of 50 mass % of a polyethylene terephthalate resin having an intrinsic viscosity of 0.62 and 50 mass % of anatase titanium dioxide having an average particle size of 0.3 μm (electron microscopy) was fed to a vented twin-screw extruder and kneaded to produce titanium-oxide-containing master pellets (M3).

Preparation of Unstretched Film 85 mass % of a polyethylene terephthalate resin having an intrinsic viscosity of 0.62, 10 mass % of a polypropylene resin with an MFR of 2.5, Mw of 320000, Mw/Mn of 4.0, and a load deflection temperature of 92° C., and 5 mass % of the titanium-oxide-containing master pellets (M3) were mixed. The mixture was vacuum-dried to obtain a starting material for cavity-containing polyester layer B. Separately, 30 mass % of the titanium-oxide-containing master pellets (M3) and 70 mass % of a polyethylene terephthalate resin having an intrinsic viscosity of 0.62 were mixed in pellet form and vacuum-dried to form a starting material for inorganic-particle-containing polyester layer A. These starting materials were separately fed into different extruders and melted at 285° C. Then, the cavity-containing polyester layer B and the inorganic-particle-containing polyester layer A were stacked in the order of A, B, and A, bonded in a feed block so that the thickness ratio was 10/80/10, and extruded from a T-die onto a cooling drum whose temperature had been adjusted to 30° C., thus producing an unstretched film having a three-layer structure with two different types of layers.

Preparation of Biaxially Stretched Film

The resulting unstretched film was uniformly heated to 70° C. using a heating roll and stretched 3.4 times in the longitudinal direction between two pairs of nip rolls having different peripheral speeds. As auxiliary heaters for the film, infrared heaters equipped with a metal reflective film (rating: 20 W/cm) were disposed for heating in the middle of the nip rolls so that the heaters faced both surfaces at a position 1 cm from the film surface. On one surface of the uniaxially stretched film obtained in this manner, the coating liquid was applied by reverse kiss coating so that the thickness of the resin solids content before stretching was 0.9 μm. After application, the resulting film was guided to a tenter, heated to 140° C. while drying, and stretched 4.0-fold in the transverse direction. With the width fixed, the film was heated at 235° C., and further relaxed by 3% at 210° C. in the width direction, thus obtaining a white laminated polyester film having a thickness of 50 μm. The film had an apparent density of 1.09 g/cm$^3$, an optical density of 0.6, an L-value of 94.4, and a b-value of 1.6.

Example 4

A white laminated polyester film was obtained in the same manner as in Example 1, except that the crosslinking agent in the coating liquid was changed to crosslinking agent (B-2).

Example 5

A white laminated polyester film was obtained in the same manner as in Example 1, except that the urethane resin in the coating liquid was changed to urethane resin (A-2), and the crosslinking agent was changed to crosslinking agent (B-2).

Example 6

A white laminated polyester film was obtained in the same manner as in Example 1 except that the urethane resin in the coating liquid was changed to urethane resin (A-3), and the crosslinking agent was changed to crosslinking agent (B-2).

Example 7

A white laminated polyester film was obtained in the same manner as in Example 1, except that the following coating components were mixed in the mixed solvent of water and isopropanol to prepare a coating liquid, and that the mass ratio of urethane resin solution (A-2)/total of crosslinking agents (B-1 and B-2)/aqueous polyester dispersion (Cw-1) based on solids content was changed to 25/26/49.

| | |
|---|---|
| Urethane resin solution (A-2) | 6.30 parts by mass |
| Crosslinking agent (B-1) | 3.73 parts by mass |
| Crosslinking agent (B-2) | 1.77 parts by mass |
| Aqueous polyester dispersion (Cw-1) | 17.00 parts by mass |
| Particles (silica particles with an average particle size of 0.45 μm, solids content, concentration: 40.00 mass) | 23.00 parts by mass |
| Surfactant (silicone-based surfactant, solids content concentration: 10 mass %) | 0.15 parts by mass |

Example 8

A white laminated polyester film was obtained in the same manner as in Example 7, except that the urethane resin in the coating liquid was changed to urethane resin (A-3) and the aqueous polyester dispersion was changed to aqueous polyester dispersion (Cw-3).

Example 9

A white laminated polyester film was obtained in the same manner as in Example 1, except that the following coating components were mixed in the mixed solvent of water and isopropanol to prepare a coating liquid, and that the mass ratio of urethane resin solution (A-3)/crosslinking agent (B-2)/aqueous polyester dispersion (Cw-1) based on solids content was changed to 27/14/59.

| | |
|---|---|
| Urethane resin solution (A-3) | 7.00 parts by mass |
| Crosslinking agent (B-2) | 3.00 parts by mass |
| Aqueous polyester dispersion (Cw-1) | 21.00 parts by mass |
| Particles (silica particles with an average particle size of 0.45 μm, solids content concentration: 40.00 mass) | 23.00 parts by mass |
| Surfactant (silicone-based surfactant, solids content concentration: 10 mass %) | 0.15 parts by mass |
| Antistatic agent (quaternary ammonium salt-based antistatic agent, solids content concentration: 17.50 mass %) | 2.00 parts by mass |

Example 10

A white laminated polyester film was obtained in the same manner as in Example 1, except that the following coating components were mixed in the mixed solvent of water and isopropanol to prepare a coating liquid, and that the mass ratio of urethane resin solution (A-3)/crosslinking agent (B-2)/aqueous polyester dispersion (Cw-1) based on solids content was changed to 28/11/61.

| | |
|---|---|
| Urethane resin solution (A-3) | 12.00 parts by mass |
| Crosslinking agent (B-2) | 4.00 parts by mass |
| Aqueous polyester dispersion (Cw-1) | 35.00 parts by mass |
| Particles (benzoguanamine formaldehyde condensate particles with an average particle size of 2 μm, solids content concentration: 40.00 mass) | 27.00 parts by mass |

-continued

| | |
|---|---|
| Surfactant (silicone-based surfactant, solids content concentration: 10 mass %) | 0.15 parts by mass |
| Antistatic agent (quaternary ammonium salt-based antistatic agent, solids content concentration: 17.50 mass %) | 2.00 parts by mass |

Example 11

A laminated polyester film was obtained in the same manner as in Example 1, except that the following coating components were mixed in the mixed solvent of water and isopropanol to prepare a coating liquid, and that the mass ratio of urethane resin solution (A-1)/crosslinking agent (B-1)/aqueous polyester dispersion (Cw-1) based on solids content was changed 35 to 22/10/68.

| | |
|---|---|
| Urethane resin solution (A-1) | 5.80 parts by mass |
| Crosslinking agent (B-1) | 2.20 parts by mass |
| Aqueous polyester dispersion (Cw-1) | 24.00 parts by mass |
| Particles (silica particles with an average particle size of 0.45 μm, solids content, concentration: 40.00 mass) | 23.00 parts by mass |
| Surfactant (silicone-based surfactant, solids content concentration: 10 mass %) | 0.15 parts by mass |

Example 12

A laminated polyester film was obtained in the same manner as in Example 11, except that the urethane resin in the coating liquid was changed to urethane resin (A-2).

Example 13

A laminated polyester film was obtained in the same manner as in Example 11, except that the urethane resin in the coating liquid was changed to urethane resin (A-3).

Example 14

A laminated polyester film was obtained in the same manner as in Example 11, except that the crosslinking agent in the coating liquid was changed to crosslinking agent (B-3), and the aqueous polyester dispersion was changed to aqueous polyester dispersion (Cw-3).

Example 15

A laminated polyester film was obtained in the same manner as in Example 11, except that the urethane resin in the coating liquid was changed to urethane resin (A-4).

Example 16

A laminated polyester film was obtained in the same manner as in Example 11, except that the urethane resin in the coating liquid was changed to urethane resin (A-5).

Example 17

A laminated polyester film was obtained in the same manner as in Example 11 except that the urethane resin in the coating liquid was changed to urethane resin (A-3), and the crosslinking agent was changed to crosslinking agent (B-2).

Example 18

A laminated polyester film was obtained in the same manner as in Example 11, except that the urethane resin in the coating liquid was changed to urethane resin (A-3), and the particles were changed to calcium carbonate particles having an average particle size of 1 μm (solids concentration: 40.00 mass %)).

Example 19

A laminated polyester film was obtained in the same manner as in Example 11, except that the urethane resin in the coating liquid was changed to urethane resin (A-9).

Comparative Example 1

A laminated polyester film was obtained in the same manner as in Example 1, except that the urethane resin in the coating liquid was changed to urethane resin (A-6).

Comparative Example 2

A laminated polyester film was obtained in the same manner as in Example 1, except that the urethane resin in the coating liquid was changed to urethane resin (A-7).

Comparative Example 3

A laminated polyester film was obtained in the same manner as in Example 11, except that the urethane resin in the coating liquid was changed to urethane resin (A-6).

Comparative Example 4

A laminated polyester film was obtained in the same manner as in Example 11, except that the urethane resin in the coating liquid was changed to urethane resin (A-7).

Comparative Example 5

A laminated polyester film was obtained in the same manner as in Example 1, except that the mass ratio of urethane resin solution (A-6)/crosslinking agent (B-1)/aqueous polyester dispersion (Cw-2) in the coating liquid based on solids content was changed to 38/7/55.

Comparative Example 6

A laminated polyester film was obtained in the same manner as in Example 1, except that the mass ratio of urethane resin solution (A-8)/crosslinking agent (B-4)/aqueous polyester dispersion (Cw-2) in the coating liquid based on solids content was changed to 22/12/66.

Table 1 shows that the results of the Examples were satisfactory in terms of adhesion to UV ink and blocking resistance when water adheres. In contrast, the results of Comparative Examples 1 to 6, in which the coating layer formed on at least one surface of the polyester film substrate did not contain a urethane resin having a branched structure, were unsatisfactory in terms of blocking resistance when water adheres.

Comparative Example 7

A laminated polyester film was obtained in the same manner as in Example 1, except that the following coating components were mixed in the mixed solvent of water and isopropanol to prepare a coating liquid, and that the ratio of urethane resin solution (A-1)/crosslinking agent (B-1) based on solids content was changed to 70/30.

| | |
|---|---|
| Urethane resin solution (A-1) | 15.00 parts by mass |
| Crosslinking agent (a-1) | 5.50 parts by mass |
| Particles (silica particles with an average particle size of 0.45 μm, solids content concentration: 40.00 mass) | 23.00 parts by mass |
| Surfactant (silicone-based surfactant, solids content concentration: 10 mass %) | 0.15 parts by mass |

Comparative Example 8

A laminated polyester film was obtained in the same manner as in Example 1, except that the following coating components were mixed in the mixed solvent of water and isopropanol to prepare a coating liquid, and that the ratio of urethane resin solution (A-1)/crosslinking agent (B-1) based on solids content was changed to 20/80.

| | |
|---|---|
| Urethane resin solution (A-1) | 4.70 parts by mass |
| Crosslinking agent (B-1) | 16.00 parts by mass |
| Particles (silica particles with an average particle size of 0.45 μm, solids content concentration: 40.00 mass) | 23.00 parts by mass |
| Surfactant (silicone-based surfactant, solids content concentration: 10 mass %) | 0.15 parts by mass |

Table 1 shows that the results of Comparative Examples 7 and 8, in which the coating layer formed on at least one surface of the polyester film substrate did not contain a polyester resin, were unsatisfactory because the adhesion between the coating layer and the substrate was low, and also unsatisfactory in terms of adhesion to UV ink.

Comparative Example 9

A laminated polyester film was obtained in the same manner as in Example 1, except that the urethane resin was changed to urethane resin (A-10).

Comparative Example 10

A laminated polyester film was obtained in the same manner as in Example 11, except that the urethane resin was changed to urethane resin (A-11).

Table 1 shows that the results of Comparative Examples 9 and 10, in which the coating layer formed on at least one surface of the polyester film substrate did not contain a urethane resin having a polycarbonate structure, were unsatisfactory in terms of adhesion to UV ink.

Table 1 summarizes evaluation results of the Examples and Comparative Examples.

TABLE 1

| | Composition for forming a coating layer | | | Content in the composition for forming a coating layer (mass %) | | | Urethane |
|---|---|---|---|---|---|---|---|
| | Urethane | Crosslinking agent | Polyester | Urethane | Crosslinking agent | Polyester | Polycarbonate structure |
| Ex. 1 | A-1 | B-1 | Cw-1 | 25 | 26 | 49 | Yes |
| Ex. 2 | A-2 | B-1 | Cw-3 | 25 | 26 | 49 | Yes |
| Ex. 3 | A-3 | B-1 | Cw-1 | 25 | 26 | 49 | Yes |
| Ex. 4 | A-1 | B-2 | Cw-1 | 25 | 26 | 49 | Yes |
| Ex. 5 | A-2 | B-2 | Cw-1 | 25 | 26 | 49 | Yes |
| Ex. 6 | A-3 | B-2 | Cw-1 | 25 | 26 | 49 | Yes |
| Ex. 7 | A-2 | B-1 B-2 | Cw-1 | 25 | 26 | 49 | Yes |
| Ex. 8 | A-3 | B-1 B-2 | Cw-3 | 25 | 26 | 49 | Yes |
| Ex. 9 | A-3 | B-2 | Cw-1 | 27 | 14 | 59 | Yes |
| Ex. 10 | A-3 | B-2 | Cw-1 | 28 | 11 | 61 | Yes |
| Ex. 11 | A-1 | B-1 | Cw-1 | 22 | 10 | 68 | Yes |
| Ex. 12 | A-2 | B-1 | Cw-1 | 22 | 10 | 68 | Yes |
| Ex. 13 | A-3 | B-1 | Cw-1 | 22 | 10 | 68 | Yes |
| Ex. 14 | A-1 | B-3 | Cw-3 | 22 | 10 | 68 | Yes |
| Ex. 15 | A-4 | B-1 | Cw-1 | 22 | 10 | 68 | Yes |
| Ex. 16 | A-5 | B-1 | Cw-1 | 22 | 10 | 68 | Yes |
| Ex. 17 | A-3 | B-2 | Cw-1 | 22 | 10 | 68 | Yes |
| Ex. 18 | A-3 | B-2 | Cw-1 | 22 | 10 | 68 | Yes |
| Ex. 19 | A-9 | B-1 | Cw-1 | 22 | 10 | 68 | Yes |
| Comp. Ex. 1 | A-6 | B-1 | Cw-1 | 25 | 26 | 49 | Yes |
| Comp. Ex. 2 | A-7 | B-1 | Cw-1 | 25 | 26 | 49 | Yes |
| Comp. Ex. 3 | A-6 | B-1 | Cw-1 | 22 | 10 | 68 | Yes |
| Comp. Ex. 4 | A-7 | B-1 | Cw-1 | 22 | 10 | 68 | Yes |
| Comp. Ex. 5 | A-6 | B-1 | Cw-2 | 38 | 7 | 55 | Yes |
| Comp. Ex. 6 | A-8 | B-4 | Cw-2 | 22 | 12 | 66 | Yes |
| Comp. Ex. 7 | A-1 | B-1 | — | 70 | 30 | — | Yes |
| Comp. Ex. 8 | A-1 | B-1 | | 20 | 80 | | Yes |
| Comp. Ex. 9 | A-10 | B-1 | Cw-1 | 25 | 26 | 49 | No |
| Comp. Ex. 10 | A-11 | B-1 | Cw-1 | 22 | 10 | 68 | No |

| | Urethane | | Crosslinking agent | Evaluation results | |
|---|---|---|---|---|---|
| | Branched structure | Mass ratio (polycarbonate polyol component/ polyisocyanate component) | Number of isocyanate functional groups | Blocking resistance when water adheres | Adhesion to UV ink (%) |
| Ex. 1 | Yes | 2.2 | 4 | A | A |
| Ex. 2 | Yes | 1.2 | 4 | A | A |
| Ex. 3 | Yes | 1.4 | 4 | A | A |
| Ex. 4 | Yes | 2.2 | 3 | A | A |
| Ex. 5 | Yes | 1.2 | 3 | A | A |
| Ex. 6 | Yes | 1.4 | 3 | A | A |
| Ex. 7 | Yes | 1.2 | 4 3 | A | A |
| Ex. 8 | Yes | 1.4 | 4 3 | A | A |
| Ex. 9 | Yes | 1.4 | 3 | A | A |
| Ex. 10 | Yes | 1.4 | 3 | A | A |
| Ex. 11 | Yes | 2.2 | 4 | A | A |
| Ex. 12 | Yes | 1.2 | 4 | A | A |
| Ex. 13 | Yes | 1.4 | 4 | A | A |
| Ex. 14 | Yes | 2.2 | — | B | A |
| Ex. 15 | Yes | 3.4 | 4 | B | A |
| Ex. 16 | Yes | 0.4 | 4 | A | B |
| Ex. 17 | Yes | 1.4 | 3 | A | A |
| Ex. 18 | Yes | 1.4 | 3 | A | A |
| Ex. 19 | Yes | 0.7 | 4 | A | B |
| Comp. Ex. 1 | No | 3 | 4 | C | A |
| Comp. Ex. 2 | No | 2.2 | 4 | C | A |
| Comp. Ex. 3 | No | 3 | 4 | C | A |
| Comp. Ex. 4 | No | 2.2 | 4 | C | A |
| Comp. Ex. 5 | No | 3 | 4 | C | C |
| Comp. Ex. 6 | No | 6.8 | 2 | C | A |
| Comp. Ex. 7 | Yes | 2.2 | 4 | B | C |
| Comp. Ex. 8 | Yes | 2.2 | 4 | A | C |
| Comp. Ex. 9 | No | 0 | 4 | A | C |
| Comp. Ex. 10 | Yes | 0 | 4 | A | C |

INDUSTRIAL APPLICABILITY

The present invention is capable of providing a white laminated polyester film that is suitable for use in fields such as labeling applications.

The invention claimed is:

1. A white laminated polyester film comprising a polyester resin layer and a coating layer on at least one surface of the polyester resin layer, wherein the coating layer is formed by curing a composition containing a urethane resin with a polycarbonate structure and a branched structure, a crosslinking agent, and a polyester resin, and wherein the white laminated polyester film is a fine-cavity-containing polyester film having an apparent density of 0.3 to 1.3 g/cm$^3$.

2. The white laminated polyester film according to claim 1, wherein the crosslinking agent is a compound containing three or more blocked isocyanate groups.

3. The laminated polyester film according to claim 2, wherein the urethane resin with a polycarbonate structure and a branched structure is obtained by synthesizing and polymerizing a polycarbonate polyol component and a polyisocyanate component, and the mass ratio of the polycarbonate polyol component to the polyisocyanate component (the mass of the polycarbonate polyol component/the mass of the polyisocyanate component) in the synthesis and polymerization is within the range of 0.5 to 3.

4. The laminated polyester film according to claim 1, wherein the urethane resin with a polycarbonate structure and a branched structure is obtained by synthesizing and polymerizing a polycarbonate polyol component and a polyisocyanate component, and the mass ratio of the polycarbonate polyol component to the polyisocyanate component (the mass of the polycarbonate polyol component/the mass of the polyisocyanate component) in the synthesis and polymerization is within the range of 0.5 to 3.

5. The laminated polyester film according to claim 4, wherein the composition further contains a silicone-based surfactant.

6. The laminated polyester film according to claim 1, wherein the composition further contains a silicone-based surfactant.

7. The laminated polyester film according to claim 2, wherein the composition further contains a silicone-based surfactant.

8. The laminated polyester film according to claim 3, wherein the composition further contains a silicone-based surfactant.

\* \* \* \* \*